United States Patent Office 3,487,032
Patented Dec. 30, 1969

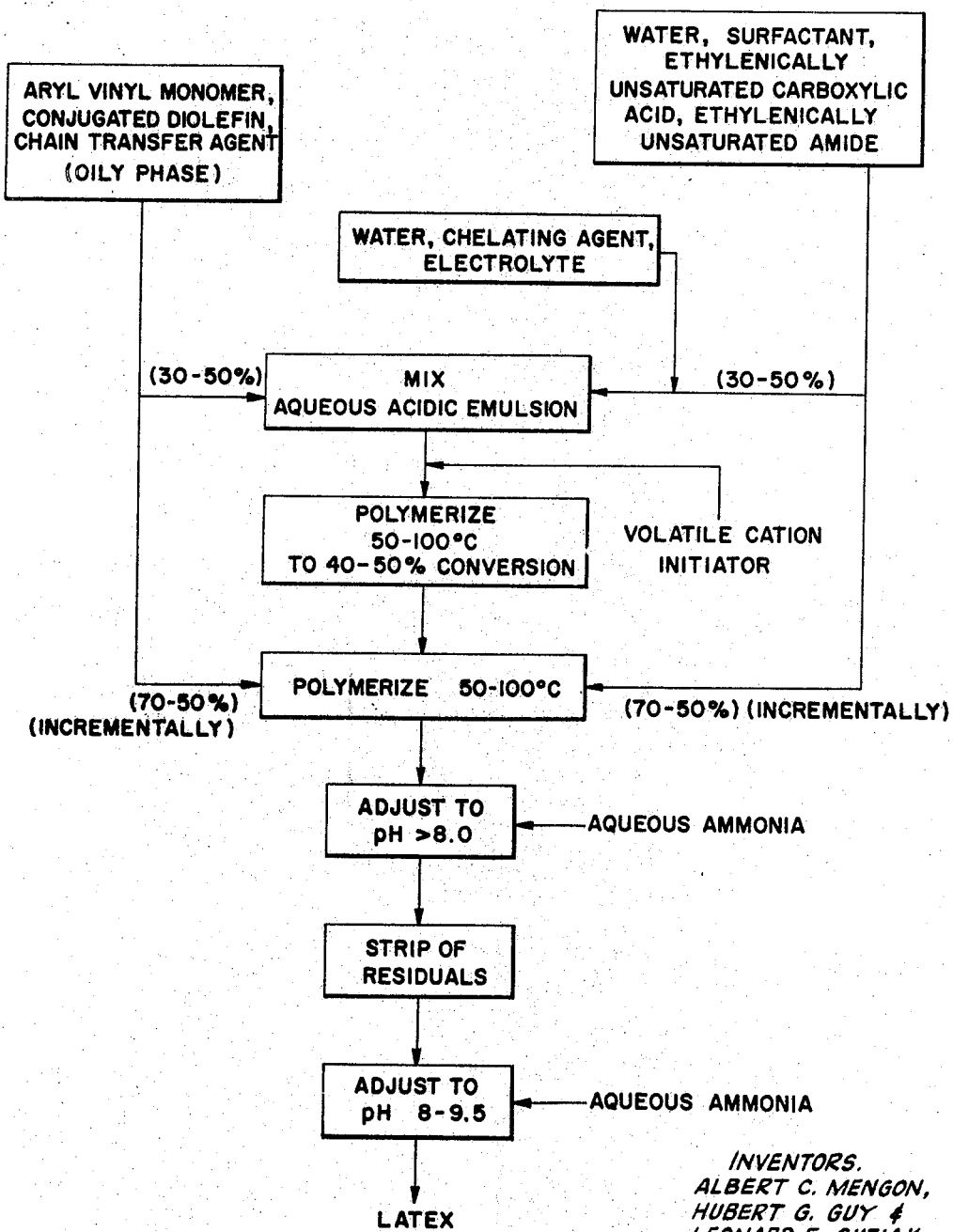

3,487,032
PROCESS COMPRISING LOW AMOUNTS OF ELECTROLYTES AND SURFACTANTS FOR PREPARING A TETRAPOLYMER LATEX
Leonard F. Guziak, Pittsburgh, Albert C. Mengon, Monaca, and Hubert G. Guy, Pittsburgh, Pa., assignors to Sinclair-Koppers Company, a partnership of Delaware
Filed June 19, 1967, Ser. No. 647,022
Int. Cl. C08f 1/13, 19/08
U.S. Cl. 260—8             8 Claims

ABSTRACT OF THE DISCLOSURE

A novel latex made from an aryl vinyl monomer such as styrene, a conjugated diolefin such as 1,3-butadiene, an ethylenically unsaturated carboxylic acid such as itaconic acid, and an ethylenically unsaturated primary amide such as acrylamide, is prepared by the use of exceptionally low amounts of electrolytes and surfactants in aqueous acidic emulsion polymerization using a heel-addition technique. The latex forms coatings which have exceptional resistance to hot or cold water, and enhanced aging, elongation and tensile properties as well as low temperature retention of such properties. The latices are useful for textile backsizing, paper saturation and as paper coatings.

BACKGROUND OF THE INVENTION

Latices containing styrene and butadiene are known for their beneficial properties in paper coating compositions. Also known are such copolymers containing carboxylic acids for use in the coating of paper or textiles. Difficulties exist with the use of such latices because of the lack of launderability, inconsistent bond strength, and the fact that in backsizing processes, such as for the rug backing trade, these latices do not have a sufficient quick-set to enable their use in the processes which are ever increasing the speed of travel of latex backsized material through curing ovens.

It has now been found that a latex formed according to the present invention, that has amide groups, possesses excellent bond strength, quick-set properties, and launderability resistance even following immersion in hot water. In addition, the latex of the present invention possesses excellent properties for a paper coating latex, exhibiting increased water resistance, increased ink holdout, increased binding power and improved smoothness. These paper coating properties are achieved even without using starch insolubilizers.

SUMMARY OF THE INVENTION

In accordance with the invention, a latex is formed by the aqueous acidic emulsion polymerization of 30 to 80 parts by weight per 100 parts of monomer of an aryl vinyl monomer, 20-70 parts by weight per 100 parts of monomer of a conjugated diolefin, 0.5-10 parts by weight per 100 parts monomer of an ethylenically unsaturated carboxylic acid and 0.1-5 parts by weight per 100 parts monomer of an ethylenically unsaturated primary amide. The emulsion polymerization system must contain only a small amount of an inorganic salt as electrolyte, less than about 0.10 part by weight per 100 parts of total monomer, and also an exceptionally small amount of an organic surfactant, about 0.13–1.5 parts by weight per 100 parts of total monomer.

The novel latex is prepared by a heel addition process. The process, schematically illustrated by flow diagram in the attached drawing, comprises charging to a polymerization reactor, water, 30–50 percent of the monomers, chain transfer agent and surfactant and the total amount inorganic salt as electrolyte and a chelating agent. This aqueous emulsion has added thereto the initiator and polymerization is commenced at 50–100° C. After the monomers in the initial charge have been polymerized to about 40–50 percent conversion, the remainder of the monomers, chain transfer agent and surfactant are added over a period of time. After all of the reactants are added, polymerization is then completed at 50–100° C. The pH of the acidic reaction mixture is adjusted to the basic range and any residual monomers removed. The removal of the monomers usually causes the pH of the aqueous latex to fall and it may be necessary to again adjust the pH to 8–9.5, to produce the novel latex.

These latices are useful in textile backsizing where they exhibit improved elongation and toughness, even with large amounts of filler, and better wet strength and quick-set properties than heretofore obtained.

Paper coatings containing the novel latices and starch or casein binder systems exhibit enhanced wet rub and wet pick resistance even without conventionally used insolubilizers. The use of latices in paper coatings is known in the art, such as is evidenced in U.S. 2,537,114 to Young et al. The novel latices of the present invention, when used to saturate paper, show increased resistance to wet abrasion over present commercial latices and over commercially used neoprene.

DETAILED DESCRIPTION

As previously described, the latices of the present invention are formed by the polymerization in acidic aqueous emulsion of an aryl vinyl monomer, a conjugated diolefin, an ethylenically unsaturated carboxylic acid and an ethylenically unsaturated primary amide.

The aryl vinyl monomers suitable for use in the present invention are styrene, substituted styrenes such as methyl styrene, dimethyl styrene, ethylstyrene, chlorostyrene, 2,4-dichlorostyrene, 2,5 - dichlorostyrene, and divinyl benzene, α - methylstyrene, α - methyl - p - methylstyrene, vinylnaphthalene, and the like, or mixtures of these compounds.

Examples of conjugated diolefins which may be used are 1,3 - butadiene, 2,3 - dimethylbutadiene, 2 - methylbutadiene - 1,3 (isoprene), 2 - chlorobutadiene - 1,3 (chloroprene), piperylene and the like.

Ethylenically unsaturated carboxylic acid components useable include the mono carboxylic acids such as acrylic acid, methacrylic acid, ethacrylic acid, and crotonic acid and the dicarboxylic acid such as itaconic acid, methyl itaconic acid, maleic acid, fumaric acid, messaconic acid, citraconic acid and the like, as well as mixtures of these.

Ethylenically unsaturated primary amides useable in the present invention would include acrylamide, methacrylamide, ethacrylamide, crotonamide, itaconamide, methyl itaconamide, maleic acid monoamide, diacetone acrylamide and the like.

The process requires that a minor amount, between 0.01 to 0.10 part per 100 parts of monomer, preferably 0.01 to 0.05 part of an inorganic salt or electrolyte be used in the polymerization. These inorganic salts highly ionize in aqueous solution. If no inorganic salt is used, the latices suffer from curd formation, and, if curd is removed, the latices which are produced are not stable to shear, that is to say that they are not resistant to mechanical shear during compoundency and application. Preferred inorganic salts are the chlorides, sulfates, bisulfites, or phosphates of the alkali metals or alkaline earth metals, such as potassium chloride, trisodium phosphate, tetrasodium phosphate, sodium hexametaphosphate and sodium chloride. The choice of inorganic salt is not as important as the fact that the amount must be limited to less than about 0.10 part per 100 parts of monomers. It is significant to note that this amount is below the amount of electrolytes generally used in emulsion polymerization.

The total amount of organic surface-active agent or surfactant is also important, and can vary from about 0.13 to 1.5 parts per 100 parts of monomer. These organic surfactants enable the formation of a colloidal solution for polymerization. Various surfactants are useable, such as the alkyl aryl sulfonates, organo phosphate esters, sulfated esters of fatty acids, sodium dodecyl diphenyl-ether disulfonates, dialkyl esters of succinic acid and other water soluble anionic surfactants. Also, nonionic surfactants are useable such as the alkyl phenyl polyethoxy ethanols, organo silicones, fluorocarbon surfactants and the like. Also, mixtures of various well-known surfactants are useable and could be chosen by one versed in the art of emulsion polymerization. The amount of surfactants used is below that normally used in emulsion polymerization, such amount normally being in the order of 2–4 parts per 100 parts of monomer.

In addition to the inorganic salts and organic surfactants, there may also be used, in the polymerization, a chelating agent such as a tetrasodium salt of ethylene-diamine tetracetate. These chelating agents are known in the art for use in emulsion polymerizations and are generally used in an amount of about 0.01 to 1.0 part per 100 parts monomer.

The polymerization catalyst or initiator used to produce the novel latex of the present invention is chosen from the many which serve as a thermally activated source of free radicals, such as the organic peroxides, perbenzoates and persulfates. Preferably, ammonium persulfate is used, as it provides efficient reaction rates and contains a fugitive cation and allows the retention of the amount of electrolytes at a low level. The amount of catalyst used is normally about 0.1 to 2.0 parts per 100 parts of monomer, preferably about 0.25 to 0.50 part.

Chain transfer agents are used in the present invention to regulate the average molecular weight of the polymer to a useable range. Those preferably used are the long chain alkyl mercaptans such as t-dodecyl-mercaptan or tridecyl mercaptans. Other useful chain-transfer agents may be used such as the lower alkyl xanthogens, alpha-bromoethylbenzene, alpha-chloroethylbenzene and carbon tetrabromide. The amount of chain transfer agent varies according to the activity of the particular agent and is readily determined by one skilled in the art.

The polymerization is carried out in aqueous acidic emulsion, the amount of water being varied according to the solids content desired in the final latex. Generally preferred is a ratio of water to monomer such that a latex having a total solids content, i.e. copolymer, surfactants and electrolytes, of from about 40–65 percent is produced. The preferred range of solids is from 48–55 percent.

In the process of the present invention, a heel or initial portion of the reactants is charged to a polymerization reactor. The initial charge comprises a portion, about 30–50 percent of the total amount, of the monomers, modifiers and surfactants with the total amount of initiator and chelating agent. If a lesser amount of the total reactants is charged, less than about 30 percent, the polymerization results in the production of curd, which is undesirable and renders the resulting latex unuseable. If too large an amount of the total monomers, greater than about 50 percent, is charged, the resulting strong exotherm creates a condition which precludes the formation of the novel latex of the present invention.

This heel portion has added thereto an initiator and is then heated to a temperature between 50–100° C., preferably 60–80° C. to polymerize the initial monomers. This polymerization is carried out to about 40–50 percent conversion which is ascertainable by determining the amount of solids formed, this conversion corresponding to a solids content in the area of 18–22 percent.

After the conversion of the initial charge or heel to 40–50 percent conversion, the remainder of the monomers, modifier and surfactants are added over a period of time. These components are added continuously or in increments, over a period preferably of about four to six hours. Shorter or longer periods of addition may be used, but problems arise as to the control of exotherm or heat build-up, which could endanger the formation of the novel latex, and should be avoided. During this time, the temperature is maintained at the level used during the initial polymerization preferably at 60–80° C., and after all monomers have been added, polymerization continued until the reaction is complete. This end point is ascertained by determining the amount of solids present (preferably in the order of 50 percent) in the latex produced.

The polymerization system is then neutralized, preferably with ammonium hydroxide, and the temperature raised or steam and vacuum used to strip off residual monomers. The resultant latex is then adjusted to a pH of about 8–10, preferably with ammonium hydroxide (keeping the amount of electrolytes low) and is ready for use. If desired, an antioxidant, may be added at this point. The latices are excellently suited for use in paper coatings. Such coatings are prepared by admixing the novel latex with an adhesive and an inorganic pigment in an aqueous suspension. The adhesive may be oxidized starch, enzyme-converted starch or casein.

Inorganic pigments generally used in paper coating compositions include clay, calcium carbonate, titanium dioxide and the like or mixtures thereof, with suitable dispersants.

The paper coating compositions using the latex of the present invention exhibit high pick resistance, exceptional wet rub resistance, oil holdout and gloss.

Our invention is further illustrated by the following examples.

EXAMPLE I

To a polymerization reactor, there was charged an aqueous solution containing 43.16 parts of water, 0.30 part of a sodium salt of dodecylbenzene sulfonate, 0.06 part of an octylphenoxypolyethoxyethanol containing about five oxyethylene units, 0.05 part of the tetrasodium salt of ethylenediamine tetracetate, 0.0275 part of potassium chloride, 0.50 part of acrylamide and 1.5 parts of itaconic acid. The solution was agitated and warmed to 50° C. and a catalyst solution of 0.30 part of ammonium persulfate in 6.07 parts of water added followed by the oily phase solution containing 21.28 parts of styrene, 16.72 parts of 1,3-butadiene and 0.304 part of mixed primary tridecyl mercaptans as modifier. The reaction mixture was agitated, heated to 72° C. and held at about 72° C. until 20% solids had been formed in the mixture (ca. 1.75 hours). There was then added in two streams, at a uniform rate during a period of 330 minutes, a first stream comprising an aqueous soltuion of 32.29 parts water, 0.30 part sodium salt of dodecylbenzene, 0.31 part of acrylamide and 0.93 part of itaconic acid and a second stream comprising an oily phase containing 34.72 parts of styrene, 27.28 parts 1,3-butadiene and 0.492 part of mixed primary tridecyl mercaptans. Following completion of the additions, the temperature was gradually raised to 80° C. and held at 80° C. until about 50% solids were present in the reaction mixture. The total reaction time was 11.75 hours. The latex was removed and placed in a stripper where it was neutralized with aqueous ammonia. Then 0.25% sodium hexametaphosphate was added and volatiles removed to a monomer content of 0.03% during which time the pH of the latex dropped. Aqueous ammonium was added to give a pH of 9.0 and the mixture filtered to give the latex product (50% solids).

EXAMPLE II

Three compositions were formed for use as textile backsizing. The purpose was to compare the novel latex of Example I with a commercial latex used in textile backsizing. Composition A contained the latex of Example I and an exceptionally high amount of filler; Composition B contained a conventional amount of filler; and Composition C contained a commercial latex, a carboxylated styrene-butadiene copolymer, for purposes of comparison.

Composition A: Parts by weight
  Latex of Example I (50% solids) _____ 200
  Water _____ 156
  Georgia marble No. 10 _____ 500
  Acrylate thickener _____ 9.5
Composition B:
  Latex of Example I (50% solids) _____ 200
  Water _____ 60
  Georgia marble No. 10 _____ 275
  Acrylate thickener _____ 6.2
Composition C:
  Commercial latex (53.5% solids) _____ 188
  Water _____ 68
  Georgia marble No. 10 _____ 260
  Acrylate thickener _____ 8.2

These three formulations all contained 68.5% solids. They were tested as scrim adhesives applied to the backside of the carpet fabric. The bond strength, "quick-set" properties and launderability of the adhesives were determined. The various tests and results are in Table I. The scrim bond test identifies the pounds force necessary to effect delamination of a 3″ strip of double jute backed tufted nylon carpet in a 180° peel test. A Scott tester is used on 3″ by 12″ specimens at 12″/minute. The wet bond and recovered dry bond values are a measure of the ability of a latex carpet coating to resist separation on laundering. An aqueous solution of a surfactant (Triton N–100), 0.5 percent based on these water, is heated to boiling. Samples of carpet, 3″ by 12″, coated with the latex, are boiled in the solution for 2 hours. The samples are removed from the solution and passed through a wringer, allowed to cool slightly, and tested with a Scott tester. One-half of the sample (6″) is pulled while wet to give the wet bond. The samples are then dried in an oven (105° C.) for 5 hours to remove excess moisture, allowed to come to room temperature and placed in a Scott tester and the remaining half of the sample pulled to obtain the recovered dry bond after the laundering. The quick set test is a test to determine the rate of formation of adhesive bond between the jute scrim or secondary backing and the coated fabric at an elevated temperature. In this test, tufted continuous filament nylon and nine ounce jute were used.

The results are listed in Table I.

TABLE I

| Properties | A | B | C |
|---|---|---|---|
| Scrim bond (lbs.) 3″ width (28 oz./sq. yd.) | 12.7 | 20.0 | 15.0. |
| Wet bond | 3.5 | 8.0 | 1.5. |
| Recovered dry bond | 9.3 | 16.5 | 10.7. |
| "Quick-Set," lbs. pull to delaminate at 300° F.: | | | |
| Six minutes | 8.5 | 7.0 | 2.0. |
| Twelve minutes | >10 | >10 | 6.0. |
| Flexibility at reduced temperature | Passes −20° C. | Passes −20° C. | Cracks at 0° C. |

It can be seen, that the latex of Example I has superior properties, and even with an exceptionally high filler content (Composition A) has comparable or better properties than a commercially available latex.

EXAMPLE III

The latex of Example I was also compared with a commercially available paper coating latex. A paper coating formulation was made containing the following:

Formulation: Parts by weight
  Latex of Examples I (48% solids) _____ 42
  Spray satin clay _____ 190
  Calcium carbonate _____ 10
  Water _____ 67
  Calgon "T" _____ 0.1
  Swift soap _____ 0.3
  Starch, 30% _____ 66
  Defoamer – 581B _____ 0.1
  Calcium stearate _____ 0.12
  Ammonium hydroxide _____ 1.0

A second formulation (Control) was prepared identical to that above except that a commercial paper coating latex (carboxylic-styrene-butadiene terpolymer) was substituted for the latex of Example I. Both formulations contained 65% solids, combined adhesives (starch and latex) of 20% and a starch-latex ratio of 1 to 1. It is important to note that no insolubilizers were added, which are normally an additional uneconomical ingredient in paper coating compositions.

The latices were used to coat a bleached paper coating raw stock, 60 pounds/ream. The latices were coated at 1200 feet per minute on a Black-Clawson roll cooater. The coating weight applied was 12 pounds per ream (dry weight) and the coated paper passed through a tunnel dryer at 270° F. (1200 f.p.m.). The dried paper was passed through four nips of a supercalender at 40 p.s.i. cylinder pressure. The paper was evaluated at Technical Association of the Pulp and Paper Industry Standard Test Methods except for the wet pick test for which no standard is available. The pick resistance relates to the resistance to removal by the pulling action of ink during high-speed printing and is a known term in the art. In determining wet pick resistance, the IGT test is followed except that the coated paper is moistened with a controlled amount of water, said amount corresponding to the amount of moisture at the fifth stage of a five-color offset printing press. Wet rub resistance was measured by the Taber Wet Rub Test. TAPPI Routine Control Method No. 184, and is basically an abrasion test.

The results of the various tests of the latices as paper coatings are listed in Table II.

TABLE II

| Properties | Latex of Example I | Control |
|---|---|---|
| Taber wet rub (percent light transmission) | 97.9 | 5.0 |
| Gloss (percent reflectance, 75° incident light) | 65.5 | 61.0 |
| K and N ink (percent brightness retained) | 84.5 | 75.8 |
| IGT Pick No. 4 ink, f.p.m | 597 | 458 |
| Oil holdout, mm | 142 | 134 |
| Varnish gloss | 81 | 78 |
| Brightness (percent reflectance of 457 mμ light) | 80 | 80 |

It is thus shown that the novel latex of the invention exhibits exceptionally high wet rub values and other enhanced physical properties.

EXAMPLE IV

A latex prepared according to the procedure of Example I was also used to saturate paper and a test made to determine the resistance of the wet saturated paper to abrasion. Two other paper saturants were used for comparison purposes, these being neoprene (a polychloroprene latex) and a second commercially available latex (styrene-butadiene latex). Samples of a standard saturation paper of 55 mils caliper were saturated in a latex batch of approximately 30% latex solids content, the paper passed between a pair of wringers and dried 30 minutes at 270° F. Testing was done on a modified crockmeter and denoted the number of strokes to failure. Fiber picking is considered to be the fail point. The results of the test were:

| Latex | Crockmeter strokes to failure | |
|---|---|---|
| | Cross direction | Machine direction |
| Example I | 38 | 27 |
| Neoprene | 27 | 25 |
| Commercial latex | 15 | 17 |

EXAMPLE V

A series of experiments were made to determine whether the addition of acrylamide to a previously prepared styrene-butadiene-carboxylic acid latex followed by polymerization of the added acrylamide would give latices comparable to those of the present invention wherein the polymerization of styrene, butadiene, a carboxylic acid and acrylamide is carried out simultaneously. Various latices were post modified with acrylamide at 1.0 and 2.0 parts acrylamide (based on latex solids) and 0.3 part initiator. The post modified latices were then cured in bottle polymerizers for three hours at 80° C. In the following table, S=styrene, B=1,3-butadiene, A=acrylic acid and I=itaconic acid. In determining "quick-set" properties, 9-ounce jute samples, 2" x 3½", have added thereto a predetermined amount of each latex composition. There is then applied a similar jute sample on the latex containing jute. The bonded jute samples are heated in an oven at 300° F. and samples of each latex bonded jute samples removed at six and at twelve minutes. The force (pounds) required to delaminate the top jute from the bottom is the quick-set value (pounds pull to delaminate at 300° F.).

min.; >10 at 10 min.; >10 at 12 min.; >10 at 14 min.; >10 at 16 min.; and a final bond of 22.7.

EXAMPLE VI

A series of experiments were carried out to show the necessity of a small quantity of an electrolyte such as potassium chloride to regulate the polymerization of the heel portion and enhance the stability of the latex and also that the electrolyte must not exceed about 0.10 part per 100 parts of monomers. A heel portion (Control) was formed from the following: 19.0 parts styrene, 19.0 parts 1,3-butadiene, 0.19 part mixed primary tridecyl mercaptans, 49.23 parts water, 0.30 part sodium salt of dodecylbenzene sulfonate, 0.60 part octylphenoxy polyethoxyethanol containing about five oxyethylene units, 0.57 part itaconic acid, 0.19 part acrylamide, 0.05 part tetrasodium salt of ethylenediamine tetracetate and 0.30 part ammonium persulfate. This heel was heated to 65° C. and reacted, samples taken each hour for four hours. An identical heel portion (A) was reacted except that 0.05 part of an electrolyte, potassium chloride was added. A similar third heel (B) was reacted except that 1.00 part of an electrolyte, Daxad 30, was added and in a fourth heel (C) 0.384 part of mixed electrolyte was added (0.225 part Daxad and 0.159 part potassium chloride). The results were:

| Composition | Parts electrolyte | Rate of reaction total (hr.) solids, percent | | | |
|---|---|---|---|---|---|
| | | 1 | 2 | 3 | 4 |
| Control | None | 12.0 | 23.1 | 33.5 | 39.7 |
| A | 0.05 | 10.6 | 20.1 | 30.5 | 37.4 |
| B | 1.00 | 8.5 | 14.0 | 18.5 | 22.9 |
| C | 0.384 | 5.5 | 7.9 | 10.2 | 13.5 |

The use of no electrolyte (Control) gave the fastest reaction, but heavy curd was formed during the four hour reaction period which renders the latex unuseable. If greater than about 0.10 part electrolyte is used, it can be seen that, although curd is not formed, the reaction is severely curtailed.

EXAMPLE VII

A series of experiments were run using a 50/50/1.5/0.5 ratio of styrene/butadiene/itaconic acid/acrylamide. In

| Latex compositions | Acrylamide, parts by weight | Percent Solids | "Quick-set," jute to jute, bond in pounds full (minutes at 300° F.) | | | | | | | | |
|---|---|---|---|---|---|---|---|---|---|---|---|
| | | | 2 | 4 | 6 | 8 | 10 | 12 | 14 | 16 | Final |
| 60 S | 0 | 47.0 | 1.75 | 3.25 | 9.5 | 8 | 6.5 | 5.25 | 6 | 6 | >25.0 |
| 40 B | 1 | 46.5 | 0.5 | 2 | 3.25 | 5 | 3.25 | 3 | 2.5 | 2.5 | 20.5 |
| 3 A | 2 | Solidified | | | | | | | | | |
| 40 S | 0 | 53.1 | 0 | 0.75 | 3.5 | 7.0 | 4.5 | 4.75 | 5.5 | 10 | 9.0 |
| 60 B | 1 | 47.3 | 0 | 0.75 | 3.25 | 3.5 | 4.5 | 5.5 | 8.0 | 8 | 21.4 |
| 1 I | 2 | 42.9 | 0.25 | 1.5 | 2.5 | 4.5 | 5.0 | 4.75 | 5.5 | 4.5 | 20.3 |
| 58 S | 0 | 51.9 | 0.25 | 2 | 4.5 | 8 | 9.5 | 8.5 | 7.5 | 6.5 | >25.0 |
| 42 B | 1 | 46.4 | 0.25 | 2 | 4.75 | 5 | 4 | 3 | 2.75 | 3.25 | 21.0 |
| 3 A | 2 | 43.9 | 0.25 | 1.25 | 3.5 | 5.5 | 4.5 | 4.25 | 4.75 | 4 | 20.3 |
| 48 S | 0 | 53.2 | 0 | 0.75 | 3 | 4.5 | 5.75 | 5.5 | 5.5 | 5 | 15.2 |
| 52 B | 1 | Solidified | | | | | | | | | |
| 3 A | 2 | Solidified | | | | | | | | | |
| 65 S | 0 | 54.7 | 0.5 | 3 | 9 | >10 | >10 | 9 | 9.25 | 9 | 25.0 |
| 35 B | 1 | 48.6 | 0.5 | 2.25 | 4.5 | 9 | 7.5 | 8 | 8.25 | 7.5 | >25.0 |
| 3 A | 2 | 43.3 | 0 | 1.25 | 2.75 | 5.75 | 4 | 4.5 | 5 | 4.75 | 18.6 |
| 46 S | 0 | 55.7 | 0.5 | 1 | 1.5 | 4 | 5 | 5.5 | 5.75 | 6 | 18.0 |
| 54 B | 1 | 49.1 | 0 | 1 | 2.75 | 2.75 | 2.5 | 3 | 2.25 | 2.75 | 12.6 |
| 1 I | 2 | Solidified | | | | | | | | | |

It is seen that the post addition of acrylamide to styrene-butadiene-carboxylic latices decreases the quick-set properties of the latices and is not comparable to the present invention. Compositions containing the ratios of components of the above latices wherein the acrylamide is added with the carboxylic acid component during polymerization exhibit properties comparable to those of the latex of Example I. To demonstrate this difference, a latex prepared according to the Example I has the following quick-set properties in pounds pull, minutes at 300° F.: 1.0 at 2 min.; 6.0 at 4 min.; 10.0 at 6 min.; >10 at 8 the polymerization was used 0.3 part anionic surfactant (sodium salt of dodecylbenzene sulfonate) 0.6 part nonionic surfactant (octylphenoxypolyethoxyethanol containing about five oxyethylene units), 0.076 part of mercaptans and 0.3 part of ammonium persulfate as initiator in recipes comparable to those of Example VI to determine the effect of the electrolyte on the latex properties. The results of the polymerization at 70° C. for 6 hours:

(A) The use of no electrolyte gave complete polymerization and some curd, but the resulting latex was unstable to shear or rubbing.

(B) The use of 0.05 part potassium chloride, as electrolyte gave complete polymerization and a latex stable to shear.

(C) The use of more than 0.1 part of potassium chloride resulted in only partial polymerization.

EXAMPLE VIII

Latices prepared according to the process of Example I using acrylic acid or methacrylic acid in place of the itaconic acid and mixtures of these acids, also exhibit the excellent properties in textile backsizings, paper coatings and as a paper saturant as does the latex of Example I.

What is claimed is:

1. Process for preparing a latex, characterized by enhanced quick-set properties, improved bond strength and water resistance, from a total monomeric mixture consisting of 100 parts of said total monomeric mixture, 30–80 parts by weight of a conjugated diolefin, 20–70 parts by weight of an aryl vinyl monomer, 0.5–10 parts by weight of an ethylenically unsaturated carboxylic acid and 0.1–5 parts by weight of an ethylenically unsaturated primary amide comprising:
   (a) polymerizing in aqueous acidic emulsion at a temperature of 50–100° C., a heel comprising 30–50 percent by weight of said total monomeric mixture to a conversion of 40–50 percent;
   (b) adding over a predetermined period of time, to said heel, at said temperature, the remaining 70–50 percent of said total monomeric mixture and continuing said polymerization to form said latex;
   (c) the polymerization of said total monomeric mixture being carried out in the presence of 0.13–1.5 parts of organic surfactant per 100 parts of said monomeric mixture and 0.01 to 0.10 part of said total monomeric mixture of an inorganic salt as electrolyte.

2. The process of claim 1 wherein said conjugated diolefin is 1,3-butadiene, said aryl vinyl monomer is styrene, said ethylenically unsaturated carboxylic acid is itaconic acid, and said ethylenically unsaturated primary amide is acrylamide.

3. The prosess of claim 1 wherein said ethylenically unsaturated carboxylic acid is at least one acid selected from the group consisting of acrylic acid, methacrylic acid and itaconic acid.

4. The latex prepared according to the process of claim 1.

5. The latex of claim 4 wherein said conjugated diolefin is 1,3-butadiene and is present in an amount of 42–46 parts, said aryl vinyl monomer is styrene and is present in 54–58 parts, said ethylenically unsaturated carboxylic acid is itaconic and is present in 1–2 parts and said ethylenically unsaturated primary amide is acrylamide and is present in 0.5–1 part.

6. In a process for polymerizing in aqueous acidic emulsion at a temperature of 50–100° C. a monomeric mixture of 30–80 parts per 100 parts mixture of 1,3-butadiene, 20–70 parts per 100 parts mixture of styrene, 0.1–5 parts per 100 parts mixture of acrylamide and 0.5–10 parts of an ethylenically unsaturated carboxylic acid selected from the group consisting of acrylic acid, methacrylic acid and itaconic acid, the improvement comprising polymerizing said monomeric mixture in the presence of 0.13–1.5 parts of an organic surfactant per 100 parts of monomeric mixture and 0.01 to 0.10 part per 100 parts of monomeric mixture of an inorganic salt as electrolyte.

7. The process of claim 6 wherein said electrolyte is present in an amount of 0.01 to 0.05 part per 100 parts of monomeric mixture.

8. The latex of claim 4 in an aqueous suspension containing an adhesive selected from the group consisting of starch and casein, and an inorganic pigment selected from clay, calcium carbonate, titanium dioxide or mixtures thereof, as a paper coating composition.

References Cited

UNITED STATES PATENTS

| | | | |
|---|---|---|---|
| 2,375,140 | 5/1945 | Semon. | |
| 2,579,908 | 12/1951 | Davison et al. | 260—95 |
| 2,952,565 | 9/1960 | Contois et al. | |
| 3,055,855 | 9/1962 | Anderson et al. | |
| 3,112,295 | 11/1963 | Marvel | 260—95 |
| 3,258,453 | 6/1966 | Longmeadow | 260—80.6 |
| 3,321,431 | 5/1967 | Cruden et al. | |
| 3,392,048 | 7/1968 | Rolik | |

FOREIGN PATENTS

| | | |
|---|---|---|
| 969,115 | 9/1964 | Great Britain. |
| 1,072,694 | 6/1967 | Great Britain. |
| 1,481,042 | 4/1967 | France. |
| 1,248,836 | 8/1967 | Germany. |

HAROLD D. ANDERSON, Primary Examiner

E. WOODBERRY, Assistant Examiner

U.S. Cl. X.R.

117—155; 260—9, 29.7, 80.73